Jan. 29, 1929.  
J. I. GOADE  
1,700,160  
FILTERING APPARATUS  
Filed Dec. 15, 1926   2 Sheets-Sheet 1

Jan. 29, 1929.  1,700,160
J. I. GOADE
FILTERING APPARATUS
Filed Dec. 15, 1926   2 Sheets-Sheet 2
Fig. 2.
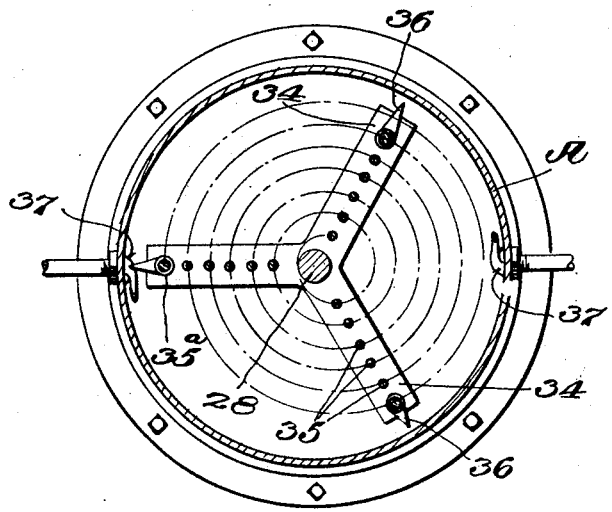
Fig. 3.
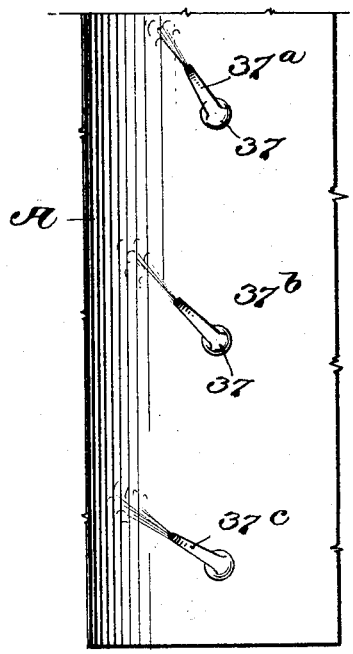
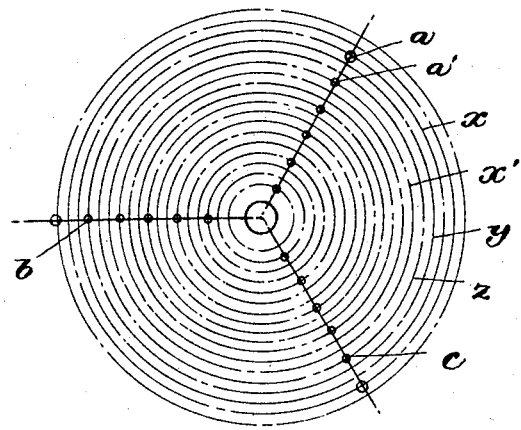
Fig. 4.
Inventor
John I. Goade,
By Prentiss, Stone & Boyden
Attorneys Patented Jan. 29, 1929.

1,700,160

UNITED STATES PATENT OFFICE.

JOHN I. GOADE, OF ALLENTOWN, PENNSYLVANIA.

FILTERING APPARATUS.

Application filed December 15, 1926. Serial No. 155,014.

My invention relates to filters, and more particularly to granular bed filters comprising a container in which is enclosed a mass of finely divided material through which the liquid percolates.

More specifically, my invention is directed to filters of the type shown in Patents 713,-759, dated Nov. 18, 1902, 748,857, dated Jan. 5, 1904, and 932,696, dated Aug. 31, 1909, all to R. J. Goade.

In these patents are illustrated and described various means for agitating, breaking up and cleaning the bed of granular material, from time to time, in order to remove the collected impurities and foreign matter therefrom.

The general object of the present invention is to provide improved means for better and more efficiently stirring and cleaning the granular material. The invention seeks especially to so construct the agitating means as to thoroughly stir up the material throughout its entire mass, and reach and act upon every portion thereof. A specific object, also, is to provide means for loosening up and cleansing the layer of granular material adjacent the side walls of the container, and which heretofore has proven difficult to dislodge and agitate, owing to its tendency to cling to such walls.

In carrying out the above objects, I contemplate the use of a rotary stirrer and agitator, of improved design, and also the employment of jets of liquid so directed as to sweep over the inner surface of the walls of the container to remove therefrom any adhering granular material.

In order that the invention may be readily understood, reference is had to the accompanying drawings, forming part of this specification, and in which:

Fig. 2 is a transverse section substantially on the line 2—2 of Fig. 1;

Fig. 3 is a fragmentary inside elevation of one of the tanks or containers, showing the arrangement of nozzles, and Fig. 4 is a diagrammatic view on an enlarged scale, illustrating my improved arrangement of stirring rods.

Figure 1:
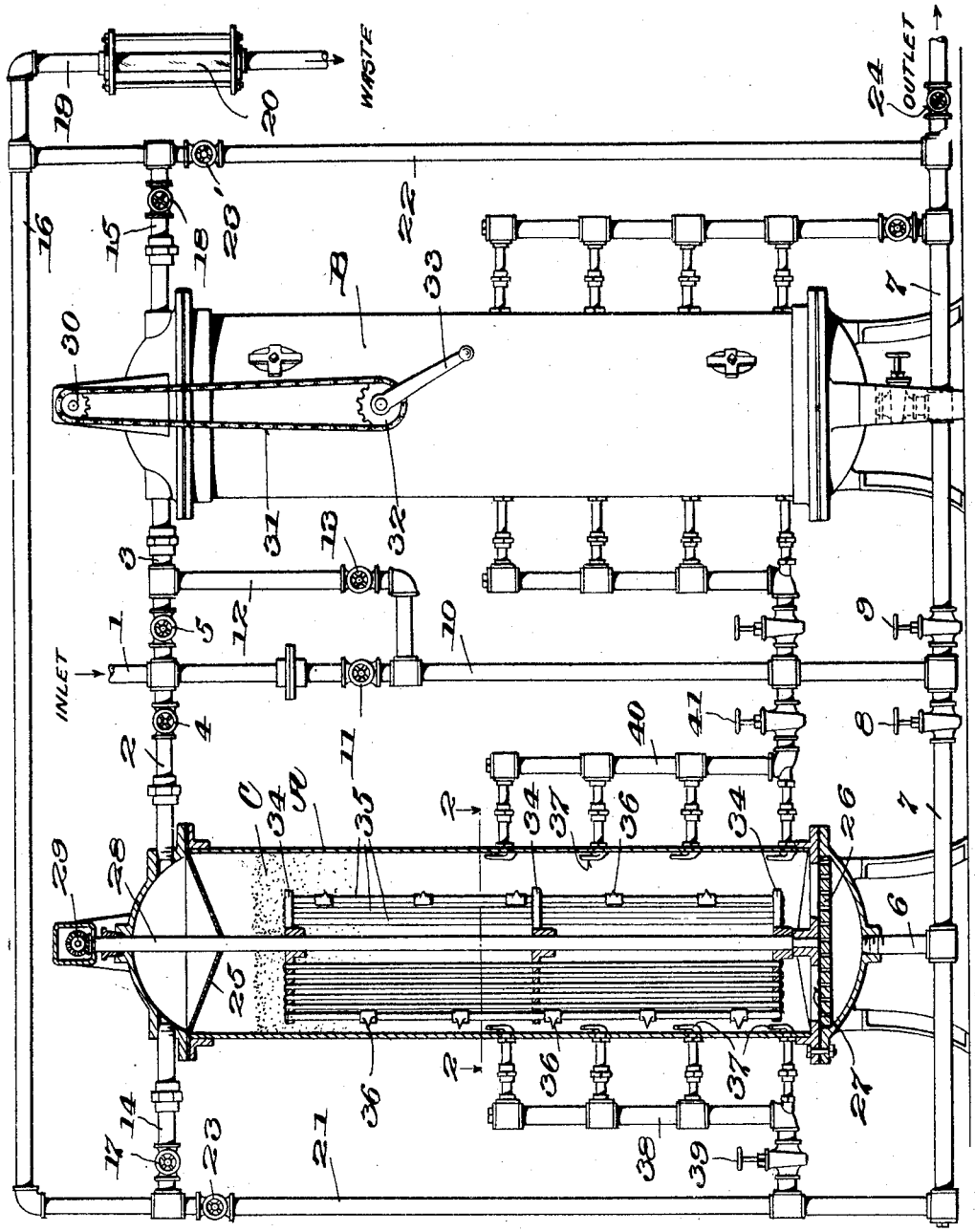
Fig. 1 is a general view of my improved filtering apparatus, parts being shown in section to illustrate the construction.

Referring to the drawings in detail, my present filtering apparatus, like that of the prior patents referred to, preferably comprises two tanks or containers A and B which are shown as in the form of cylindrical drums. These containers are filled nearly, but not entirely full of a suitable granular material constituting a filter bed, as indicated at C.

The liquid to be filtered flows in a pipe 1, and enters the tops of containers A and B, through pipes 2 and 3, as shown. The filtered liquid passes out from the bottom of the containers through pipes 6, into a pipe 7 which constitutes the outlet leading to the distributing system to be supplied.

Valves 4 and 5 are placed in the pipes 2 and 3 respectively and valves 8 and 9 in the pipe 7. A pipe 10 connects the inlet 1 with a point in the pipe 7 between the valves 8 and 9, and this pipe 10 contains a valve 11. A by-pass 12 containing a valve 13 is shunted around the valves 5 and 11, as shown.

Also tapping the tops of the containers A and B are pipes 14 and 15 controlled by valves 17 and 18, and connected with a common pipe 16 which is joined to a waste pipe 19 leading to the sewer, a sight glass 20 being preferably interposed in the pipe 19, so that the nature of the liquid flowing therethrough may be observed. Pipes 21 and 22 connect the pipe 7 with the junctions of pipe 16 with pipes 14 and 15 respectively, valves 23 and 23' being placed in these pipes.

A valve 24 is provided in the pipe 7 at a point beyond the junction with pipe 22.

Near the top of each container is a suitable screen 25, preferably conical, as shown, the purpose of this screen being to prevent the escape of the granular material when the flow through the container is reversed, as hereinafter described. At the lower end of each container is a grid or grate 26 on which is superposed a fine mesh screen 27, this grate and screen serving as a support for the bed of filtering material. The above described construction is substantially the same as that shown in the above-mentioned patents, and forms no part of my present invention.

In order to thoroughly break up and agitate the filter bed when it becomes necessary to cleanse the same, I provide improved agitating and stirring means comprising a vertical shaft 28 journaled at each end in the container and adapted to be rotated by means of gearing 29, sprocket wheels 30 and 32, sprocket chain 31, and crank 33. Other means for rotating the shaft may, of course, be provided.

On this shaft 28 I mount a plurality of spiders 34, three such spiders being illustrated, one near each end and one in the middle of the shaft, each of said spiders having three arms, as clearly shown in Fig. 2. In each of the corresponding sets of arms of these spiders I mount a radially disposed series of axially extending parallel spaced rods 35, these rods being at all times embedded throughout their length in the granular material.

It will be seen that the rods in each set of arms are arranged at progressively increasing distances from the shaft 28, and the improved method of distributing these rods will be clear from an inspection of Figs. 2 and 4. The object of the special arrangement of rods which I have devised is for the purpose of causing each rod to travel in its own circular path, such path being spaced radially from the path of travel of all other rods. In other words, no two rods travel in the same path.

Referring to Fig. 4, it will be seen that one of the rods, such as $a$, travels in the circular path $x$, while the adjacent rod $a'$ of the same series, travels in a path $x'$. It will further be observed that the corresponding rods $b$ and $c$ of the other two series travel in circular paths $y$ and $z$, which paths lie radially between the paths $x$ and $x'$. This is true for every rod in all of the series. That is to say, the path of movement of any rod in any series lies between two adjacent rods in the next series.

By virtue of the above arrangement, it will be seen that every portion of the cubical contents of the solid of revolution defined or swept out by the outermost rods is traversed by some one of the rods. No part or portion of the filter bed within the radius of the stirrer, therefore, escapes, but when the stirrer rotates, every cubic unit is broken up and agitated.

In order to produce the above results, it has been found convenient to lay out the position of the rods in the spiders by means of a spiral, as shown in Fig. 2. When the rods are arranged on a spiral such as illustrated, it is found that they all travel in separate circular paths, as shown in Fig. 4, and the desired object is achieved.

In order to insure the loosening and breaking up of the layer of granular material adjacent the side walls of the container, I mount on the outermost rods a plurality of stirring fingers 36, such outermost rods being preferably made larger than the other rods, as indicated at $35^a$ in Fig. 2, so as to properly support such fingers. These fingers are so proportioned as to run very close to the inner surface of the walls of the container and thus serve to dislodge and break up any material which tends to cling to such wall. By reference to Fig. 1, it will be further noted that the series of fingers 36 on the several rods are arranged in staggered relation, so that all of these fingers travel in different horizontal planes, thus operating on different portions of the filter bed.

In order to still further insure the loosening up and removal of any portions of the granular material which tends to cling to the walls of the container, I provide a series of nozzles arranged to deliver jets of liquid into the bed of material. These nozzles are indicated in the drawings at 37, and are shown as connected with pipes 38 and 40, which, in turn, communicate with pipes 21 and 10 respectively, through valves 39 and 41.

Referring to Fig. 3, I have designated the several nozzles of each series as $37^a$, $37^b$, $37^c$, etc., and it will be observed that the nozzles are so disposed as to deliver the jets in a direction substantially parallel with the inner surface of the walls of the container. Moreover, it will be further seen from an inspection of Fig. 3, that these nozzles are disposed at different angles to the axis of the container, thus causing the jets to diverge. As is obvious, these liquid jets which are discharged into the mass of granular material in a direction substantially parallel with the walls of the container, serve to sweep from such walls any material which may tend to cling thereto.

Referring again to Fig. 1, it will be further noted that two series of jets are provided and arranged at diametrically opposite sides of the container, the inclination of the jets being such as to cooperate in tending to give a whirling motion to the contents of the container. It will also be seen that the nozzles are arranged in such vertical positions as to lie between the planes of travel of the stirring fingers 36, so that such stirring fingers can be constructed to move in close proximity to the walls of the container and at the same time clear said nozzles.

The operation of my improved filtering apparatus as a whole will now be briefly described. We will assume that all of the valves shown in Fig. 1 are closed. When it is desired to use the two tanks or containers A and B in parallel to supply filtered water to the house pipes or other distributing system, the valves 4, 5, 8, 9 and 24 are opened, the others remaining closed. Liquid will then flow from the pipe 1 through the pipes 2 and 3, down through the filters into pipe 7 and out through valve 24.

It is also possible to use the two filters in series, if desired. To do this, valves 4, 8, 13 and 24 are opened, all others being closed. Liquid will then flow downwardly through the tank A, thence upwardly through pipes 10 and 12 into tank B, and then out into the pipe 7.

It is the common practice to cleanse filters of this character and remove the accumulated impurities and foreign matter therefrom by reversing the flow through the tanks. To do this, valves 11, 8, 9, 17 and 18 are opened, all others being closed. The liquid will then flow down through pipe 10, upwardly through both tanks in parallel, and out through pipes 14, 15, 16, and 19 to the sewer. In order to thoroughly cleanse the filter bed, my improved agitating means is operated at the same time that the reverse flow is taking place, thus thoroughly breaking up and agitating the granular material so as to expose all portions of it to the action of the liquid currents. Also at the same time, in order to secure even still greater efficiency, the valves 39 and 41 are opened, thus admitting liquid under pressure to the nozzles 37 and causing high pressure jets of liquid to be discharged into the semi-fluid mass of material.

After the cleansing operation just described has been carried on for a sufficient length of time, as may be determined by observing the sight glass 20, the reverse flow is stopped and the liquid admitted from pipe 1 into the upper ends of the containers again. As the whole system is at this time filled with unfiltered liquid, it is necessary to first carry off this unfiltered liquid before opening the valve 24. This is accomplished by opening valves 4, 5, 23 and 23′, thus allowing liquid to flow out through pipes 16 and 19 to the waste, for a short time. After all of the unfiltered water has run off in this way, the valves 23 and 23′ are closed and the valve 24 opened, whereupon the normal flow of filtered liquid to the distributing system will be resumed.

With the arrangement shown in Fig. 1, it is also possible to clean or wash the granular material in one tank with filtered liquid from the other tank. To do this, for example, to wash out tank A with filtered water from tank B, the valves 5, 9, 8 and 17 are opened, while all others remain closed. At the same time, valves 39 and 41 may be opened so as to supply jets of filtered liquid into the tank A to assist in cleaning the material, as above described.

What I claim is:

1. A filter comprising a cylindrical container, a bed of granular material therein, and means for agitating said material, said means comprising an axially extending shaft, and means for rotating it, a plurality of rods carried by said shaft in spaced parallel relation therewith, whereby they travel in circular paths when the shaft is rotated, stirring fingers secured to and projecting radially beyond said rods into close proximity to the inner walls of said container, and nozzles carried by said walls at points between the planes of movement of said fingers, and arranged to deliver jets of liquid in a substantially circumferential direction and substantially parallel with said walls.

2. A filter comprising a container, a bed of granular material therein, a rotary stirrer for agitating said bed, and a plurality of nozzles set into the walls of said container and arranged to discharge jets of liquid within said bed and in a substantially circumferential direction and substantially parallel with and closely adjacent to said walls.

3. A filter comprising a container, a bed of granular material therein, and means for breaking up and cleaning said bed, said means comprising nozzles set into the walls of said container and arranged to deliver jets of liquid along the face of said walls in a substantially circumferential direction, and within said bed of material.

4. A filter comprising a container, a bed of granular material therein, and means for breaking up and cleaning said bed, said means comprising nozzles set into the walls of said container and arranged to deliver jets of liquid along the face of said walls, and within said bed of material, said nozzles being angularly disposed relative to each other, and closely adjacent to said walls, so as to direct the jets in different circumferential directions.

In testimony whereof I affix my signature.

JOHN I. GOADE.